United States Patent Office 3,759,841
Patented Sept. 18, 1973

3,759,841
METHOD OF MANUFACTURING A SUPPORTED CATALYST CONTAINING PLATINUM GROUP METAL, RHENIUM OR GROUP IV–A METAL
Frederick C. Wilhelm, Arlington Heights, Ill., assignor to Universal Oil Products Company, Des Plaines, Ill.
No Drawing. Filed May 10, 1971, Ser. No. 142,029
Int. Cl. B01j 11/78
U.S. Cl. 252—441
10 Claims

ABSTRACT OF THE DISCLOSURE

A method of catalyst manufacture. A platinum group metal compound in common solution with a group IV–A metal and/or rhenium compound is impregnated on a carrier material. The common solution further contains a weak acid which acts as a buffer to maintain the solution at a pH of less than about 3.5 in contact with the carrier material.

The reforming of gasoline boiling range feed stocks to improve the octane rating thereof is a process well known to the petroleum industry. The feed stock may be a full boiling range gasoline fraction boiling in the 50°–425° F. range, although it is more often what is commonly called naphtha—a gasoline fraction characterized by an initial boiling point of from about 150° to about 250° F. and an end boiling point of from about 350° to about 425° F.

The reforming of gasoline boiling range feed stocks is generally recognized as involving a number of octane-improving hydrocarbon conversion reactions requiring a multifunctional catalyst. In particular, the catalyst is designed to effect several octane-improving reactions with respect to paraffins and naphthenes—the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring-isomerization to yield aromatics of improved octane value. With most naphthenes being in the 65–80 F–1 clear octane range, the octane improvement, while substantial, is not as dramatic as in the case of the lower octane paraffins. Reforming operations thus employ a multi-functional catalyst designed to provide the most favorable balance between the aforementioned octane-improving reactions to yield a product of optimum octane value, said catalyst having at least one metallic dehydrogenation component and an acid-acting hydrocracking component.

However, even with the achievement of the desired balance between the octane-improving reactions, problems persist relating principally to undesirable side-reactions, which, although minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight-chain hydrocarbons; condensation of aromatics forms coke precursors and carbonaceous deposits; and the acid catalyzed polymerization of olefins and other polymerizable materials yields high molecular weight hydrocarbons, subject to dehydrogenation and the further formation of carbonaceous matter.

Accordingly, an effective reforming operation is dependent on the proper selection of catalyst and process variables to minimize the effect of undesirable side reactions for a particular hydrocarbon feed stock. However, the selection is complicated by the fact that there is an inter-relation between reaction conditions relating to undesirable side reactions and desirable octane-improving reactions. Reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of the lower boiling $C_6$–$C_8$ constitutents is not desirable since this produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentration in the reaction media. Low hydrogen partial pressures have a further advantage in that the main octane-improving reactions, i.e., dehydrogenation of paraffins and naphthenes, are net producers of hydrogen and, as such, favored by low hydrogen pressures.

Catalysts comprising a supported platinum group metal, for example, platinum supported on alumina, are widely known for their selectivity in the production of high octane aromatics, for their general activity with respect to each of the several octane-improving reactions which make up the reforming operation, and for their stability at reforming conditions. One of the principal objections to low pressure reforming relates its effect on catalyst stability. This stems from the fact that low pressure operation tends to favor the aforementioned condensation and polymerization reactions believed to be the principal reactions involved in the formation of coke precursors and carbon deposits so detrimental to catalyst stability.

More recently, the industry has turned to certain multi-component or bi-metallic catalysts to make low pressure reforming, and all the advantages attended therewith, a reality. While tin promoted platinum catalysts have been proposed, the activity, selectivity, and particularly the stability have not heretofore been adequate to warrant commercial acceptance on any appreciable scale.

It is generally recognized that catalysis involves a mechanism particularly noted for its unpredictability. Minor variations in a method of manufacture often result in an unexpected improvement in the catalyst product. The improvement may result from an undetermined and minor alteration of the physical character and/or composition of a catalyst product to yield a novel composition difficult of definition and apparent only as a result of substantially improved activity, selectivity, and/or stability realized with respect to one or more conversion reactions. For example, it has been discovered that the aforementioned tin-promoted platinum catalyst, modified in the course of manufacture with respect to the method of impregnating the tin and platinum components on a carrier material, exhibits a substantial improvement over prior art tin-platinum reforming catalysts, particularly with respect to stability.

In one of its broad aspects, the present invention embodies a method of catalyst manufacture which comprises preparing a solution of a platinum group metal compound and a compound of a promoter metal selected from the group consisting of rhenium and the metals of group IV–A, and forming a buffer solution by the addition of a weak acid thereto; impregnating a high surface area, porous carrier material with said buffer solution, the concentration of weak acid in said buffer solution being sufficient to maintain the pH thereof at less than about 3.5 in contact with said carrier material; and drying and calcining the impregnated carrier material.

Other objects and embodiments of this invention will become apparent in the following detailed specification.

In accordance with the method of this invention, a high surface area, porous carrier material is impregnated with a solution comprising a compound of a platinum group metal and a compound of a group IV–A metal and/or rhenium. Suitable carrier materials include any of the various and well known solid adsorbent materials generally utilized as a catalyst support or carrier material. The preferred carrier materials are the refractory inorganic oxides including alumina, silica, zirconia, thoria, boria, etc., and combinations thereof, such as, alumina-silica, alumina-zirconia, and the like. The better results are achieved with an alumina carrier material, particularly an alumina carrier material with a surface area of from about 25 to about 500 square meters per gram. Suitable aluminas include gamma-alumina, eta-alumina and theta-alumina, of which the first mentioned gamma-alumina is preferred. In particular, gamma-alumina carrier material characterized by an apparent bulk density of from about 0.30 to about 0.70 grams per cubic centimeter, an average pore diameter of from about 20 to about 300 Angstroms, an average pore volume of from about 0.10 to about 1.0 cubic centimeters per gram, and a surface area of from about 150 to about 500 square meters per gram, is a suitable carrier material.

The alumina may be a naturally occurring alumina or it may be synthetically prepared in any conventional or otherwise convenient manner. The alumina is typically alumina in a shape or form determinative of the shape or form of the intended catalyst product, e.g., spheres, pills, granules, extrudates, powder, etc. A particularly preferred form is the sphere, especially alumina spheres prepared substantially in accordance with the oil-drop method described in U.S. Pat. 2,620,314. Briefly, said method comprises dispersing droplets of an alumina sol into a hot oil bath—an aluminum chloride sol such as is prepared by digesting aluminum pellets in hydrochloric acid and/or aqueous aluminum chloride solution being of advantage as will appear. In any case, the droplets are retained in the oil bath until they set into firm gel spheroids. The spheroids are continuously separated form the oil bath and subjected to specific aging treatments to promote certain desirable properties. The spheres are subsequently dried at from about 105° to about 395° F. and are thereafter calcined at from about 800° to about 1400° F.

Catalysts such as herein contemplated typically comprise platinum although other platinum group metals including palladium, ruthenium, rhodium, iridium and osmium may be employed. Suitable platinum group metal compounds for use in the common impregnating solution include platinum chloride, chloroplatinic acid, ammonium chloroplatinate, dinitrodiamino platinum, palladium chloride, chloropalladic acid, and the like. Although this invention is particularly directed to the preparation of a catalyst comprising tin in combination with a platinum group metal, the invention is also applicable to prepare catalysts comprising other group IV–A metals, e.g., germanium, lead, etc., and also rhenium in combination with a platinum group metal. Suitable rhenium and group IV–A metal compounds include rhenium trichloride, perrhenic acid, stannous chloride, stannic chloride, germanium dichloride, germanium tetrachloride, germanium oxychloride, lead acetate, and the like. In any case, the concentration of promoter metal and platinum group metal in the impregnating solution is selected to yield a catalyst product containing from about 0.01 to about 5.0 wt. percent promoter metal and from about 0.01 to about 2.0 wt. percent platinum group metal calculated on an elemental basis. Excellent results are obtained when the catalyst contains from about 0.05 to about 1.0 wt. percent of each tin and platinum.

The catalyst of this invention is also prepared to contain a halogen component to enhance the acidic function of the catalyst in the traditional manner. The halogen component may be chlorine, fluorine, bromine, iodine, or mixtures thereof. Of these, fluorine, and particularly chlorine, are preferred for the purpose of this invention. In any case, at least a portion of the halogen is incorporated in the catalyst by acidification of the impregnating solution with an appropriate halogen acid to a pH of less than about 3.5, and preferably to a pH of less than about 1. Halogen may also be introduced to the catalyst through the use of a platinum group metal compound, group IV–A metal compound and/or rhenium compound which comprises a desired halogen. Another convenient means of incorporating at least a portion of the halogen component in the catalyst is by use of the aforementioned aluminum chloride hydrosol in the preparation of the preferred alumina carrier material. Regardless of the method of incorporating the halogen component, the finished catalyst product may be further treated with an appropriate halogen, or halogen acid, to add additional halogen thereto, or treated with steam to reduce the halogen content thereof—the halogen component being limited to from about 0.1 to about 1.5 wt. percent of the final catalyst product, and preferably to from about 0.4 to about 0.9 wt. percent thereof.

Pursuant to the present invention, the impregnating solution further comprises a buffer—preferably a partially ionized or weak acid—whereby any change in the pH value of the impregnating solution in contact with the carrier material is substantially obviated. Oxalic acid is a suitable and preferred buffering agent. Other weak acids having a relatively high dissociation constant similar to oxalic acid are particularly suitable in the practice of this invention, for example, trichloroacetic acid, picric acid, maleic acid, dichloroacetic acid, chloroacetic acid, o-chlorobenzoic acid, fumaric acid, malonic acid, phthalic acid, salicylic acid, tartaric acid, periodic acd, citric acd, pyrophosphoric acid, phosphoric acid, o-phosporic acid, and the like.

Impregnating conditions employed herein involve conventional impregnating techniques known to the art. Thus, the catalytic components, or soluble compounds thereof, are adsorbed on the carrier material by soaking, dipping, suspending, or otherwise immersing the carrier material in the impregnating solution, suitably at ambient temperature conditions. The carrier material is preferably maintained in contact with the impregnating solution at ambient temperature conditions for a brief period, preferably for at least about 30 minutes, and the impregnating solution thereafter evaporated substantially to dryness at an elevated temperature. For example, a volume of alumina particles is immersed in a substantially equal volume of impregnating solution in a steam-jacketed rotary dryer and tumbled therein for a brief period at about room temperature. Thereafter, steam is applied to the jacket of the dryer to expedite the evaporation of said solution and recovery of substantially dry impregnated carrier material.

Thus, one preferred embodiment of the present invention relates to a method of catalyst manufacture which comprises preparing a common solution of chloroplatinic acid and stannous chloride and forming a buffer solution by the addition of oxalic acid thereto; impregnating a gamma-alumina carrier material with said buffer solution, the concentration of oxalic acid in said buffer solution being sufficient to maintain the pH thereof at less than about 1 in contact with said carrier material and drying and calcining the impregnated material.

The improvement observed in the catalyst prepared according to the method of this invention is considered to result from a more uniform distribution of the promoter metal components, e.g. tin, with the platinum group metal component on the carrier surface. With conventional impregnating techniques, the carrier material tends to adsorb acid anions from the impregnating solution whereby the pH is increased in favor of hydrolysis and premature precipitation of the tin component, and such premature precipitation adversely affects the desired uniform distribution thereof with the platinum group metal component on the carrier surface. However, the inclusion of a buffering agent in the impregnating solution pursuant to the method of the present invention, permits the solution to be maintained in contact with the carrier material for an extended period at conditions to effect an equal and uniform distribution of the catalytic components thereon. In other words, the buffering agent permits the impregnating solution to be maintained in contact with the carrier material at an optimum low pH, preferably less than about 1, whereby premature precipitation of the catalytic components is substantially obviated. The buffering agent thus preserves the intimate association of the tin and platinum components essential to improved activity, selectivity and stability of the final catalyst product.

Regardless of the details of how the components of the catalyst are combined with the porous carrier material, the final catalyst composite generally will be calcined in an oxidizing atmosphere such as air at a temperature of from about 400° to about 1200° F. The catalyst particles are advantageously calcined in stages to experience a minimum of breakage. Thus, the catalyst particles are advantageously calcined for a period of from about 1 to about 3 hours in an air atmosphere at a temperature of from about 400° to about 700° F., and immediately thereafter at a temperature of from about 900° to about 1200° F. in an air atmosphere for a period of from about 3 to about 5 hours. Best results are generally obtained when the halogen content of the catalyst is adjusted during the calcination step by including a halogen or a halogen-containing compound in the oxidizing atmosphere. In particular, when the halogen component of the catalyst is chlorine, it is preferred to use steam and HCl in a mole ratio of from about 20:1 to about 100:1 during at least a portion of the calcination step in order to adjust the final chlorine content of the catalyst to a range of from about 0.6 to about 1.2 wt. percent.

It is preferred that the resultant calcined catalytic composite be subjected to a substantially water-free reduction step prior to its use in the conversion of hydrocarbons. This step is designed to further insure a uniform and finely divided dispersion of the metallic components throughout the carrier material. Preferably, substantially pure and dry hydrogen (i.e., less than 20 volume p.p.m. $H_2O$) is used as the reducing agent in this step. The reducing agent is contacted with the oxidized catalyst at conditions 1000 p.s.i.g. and at a temperature of from about 800° to about 1200° F. This reduction step may be performed in situ as part of a start-up sequence if precautions are taken to predry the plant to a substantially water-free state and if substantially water-free hydrogen is used. The duration of this step is preferably less than 2 hours, and typically about 1 hour.

Reforming of gasoline feed stocks in contact with the catalyst of this invention as herein contemplated, is suitably effected at a pressure of from about 50 to about 1000 p.s.i.g. and at a temperature of from about 800° to about 1100° F. The catalyst of this invention permits a stable operation to be carried out in a preferred pressure range of from about 50 to about 350 p.s.i.g. In fact, the stability exhibited by the catalyst of this invention is equivalent to or greater than has heretofore been observed with respect to prior art reforming catalysts at relatively low pressure reforming conditions. Similarly, the temperature required is generally lower than required for a similar reforming operation utilizing prior art reforming catalysts. Preferably, the temperature employed is in the range of from about 900° to about 1050° F. It is well known in the art that the initial temperature selection is made primarily as a function of the desired octane rating of the product, and the temperature is subsequently adjusted upwardly during the reforming operation to compensate for the inevitable catalyst deactivation that occurs and to provide a constant octane product. It is a feature of the present invention that the required rate of temperature increase to maintain a constant octane product is substantially lower than is required with prior art catalysts including prior art tin-platinum catalysts.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second and third stage oxidation products. Reaction conditions employed in the various hydrocarbon conversion reactions are those heretofore practiced in the art. For example, alkyl aromatic isomerization reaction conditions include a temperature of from about 32° to about 1000° F., a pressure of from about atmospheric to about 1500 p.s.i.g., a hydrogen to hydrocarbon mole ratio of from about 0.5:1 to about 20:1 and a LHSV of from about 0.5 to about 20. Likewise, typical hydrocracking reaction conditions include a pressure of from about 500 to about 3000 p.s.i.g., a temperature of from about 390° to about 935° F., a LHSV of from about 0.1 to about 10, and a hydrogen circulation rate of from about 1000 to about 10,000 s.c.f./bbl. (standard cubic feet per barrel of charge).

The following examples are presented in illustration of the method of this invention and are not intended as an undue limitation on the generally broad scope of the invention as set out in the appended claims.

Gamma-alumina spheres of about 1/16" diameter were prepared by the described oil-drop method. Thus, an aluminum chloride hydrosol, prepared by digesting aluminum pellets in dilute hydrochloric acid, was commingled with hexamethylenetetramine and dispersed as droplets in a hot oil bath. The resulting spheres were aged in the oil bath over-night and then washed, dried and calcined. The alumina spheres had an average bulk density of about 0.5 gms./cc. and a surface area of about 180 m.$^2$/gm.

In preparing the impregnating solution, 29.3 gms. of oxalic acid was first dissolved in 150 ml. of warm water and the solution cooled to about room temperature to serve as a buffering agent. The oxalic acid solution was then admixed with 4.46 ml. of chloroplatinic acid solution containing 105 mg. of pt. ml., the resulting solution assuming a pale yellow color. To this solution was added 12.5 ml. of a stannous chloride solution containing 25 mg. of $Sn^{+2}$/ml. and prepared by dissolving stannous chloride in hydrochloric acid. Within 10–15 minutes, the solution turned orange in color and had a pH of about 0.6.

About 250 cc. of the calcined alumina spheres were immersed in the described solution in a steam-jacketed rotary evaporator, the volume of the solution being substantially equivalent to the volume of carrier material. The spheres were allowed to soak in the impregnating pH of the solution in contact with the alumina spheres remaining at about 0.6. The impregnated alumina spheres were then dried by applying steam to the evaporator jacket whereby the solution was evaporated substantially to dryness. The dried spheres were subsequently heated to 392° F. in air and, after about one-half hour at said temperature, heated to about 1000° F. in air and held for 2½ hours. The catalyst particles were then treated in a substantially pure hydrogen stream for about 1 hour at 1050° F. to yield the reduced form of the catalyst. The final catalyst product contained 0.375 wt. perecent platinum and 0.25 wt. percent tin, calculated as the elemental metal.

The described catalyst composite, hereinafter referred to as catalyst A, was evaluated for stability under exceptionally severe reforming conditions utilizing a laboratory scale reforming apparatus comprising a reactor column, a high pressure-low temperature product separator, and a debutanizer column. A charge stock, boiling in the 205°–400° F. range and having an octane rating of about 50 F–1 clear, was admixed with hydrogen and charged downflow through the reactor column in contact with 100 cubic centimeters of catalyst disposed in a fixed bed therein. The stability test consisted of six periods, each of which included a twelve hour line-out and a twelve hour test period. The test was designed to measure, on an accelerated basis, the stability characteristics of the catalyst in a high severity reforming operation. Accordingly, hydrogen was admixed with the hydrocarbon charge stock in only a 5:1 mole ratio, and the mixture preheated to about 930° F., and charged to the reactor at a liquid hourly space velocity of 1.5. The reactor inlet temperature was adjusted upward periodically to maintain the $C_5+$ product octane at 102 F–1 clear. The reactor outlet pressure was controlled at 100 p.s.i.g. The reactor effluent stream was cooled in the product separator to about 55° F. and a portion of the hydrogen-rich gaseous phase separated and recycled to effect the aforesaid hydrogen/hydrocarbon ratio. The excess separator gas, representing hydrogen make, was measured and discharged. The liquid phase was recovered from the product separator through a pressure reducing valve and treated in the debutanizer column, with a $C_5+$ product being recovered as debutanizer bottoms.

The results of the stability test are tabulated below with reference to a catalyst B containing 0.75 wt. percent platinum and with reference to a catalyst C containing 0.375 wt. percent platinum in combination with 0.22 wt. percent tin. Catalysts B and C were prepared in substantially the same manner as catalyst A except that conventional impregnating techniques were employed. Thus, catalyst B was prepared by impregnating the alumina sphere with a chloroplatinic acid solution, and catalyst C by impregnating the alumina with chloroplatinic acid and stannic chloride solution.

| Period no. | Temperature, °F. | $C_5+$ volume percent | Debutanizer gas, s.c.f./bbl. | $H_2/HC$ mole ratio |
|---|---|---|---|---|
| Catalyst A, 0.375 wt. percent Pt, 0.25 wt. percent Sn | | | | |
| 1 | 968 | 75.6 | 74 | 5:1 |
| 2 | 876 | 77.2 | 68 | 5:1 |
| 4 | 981 | 78.1 | 68 | 5:1 |
| 6 | 988 | 76.8 | 72 | 5:1 |
| Catalyst B, 0.75 wt. percent Pt | | | | |
| 1 | 978 | 69.4 | 108 | 10:1 |
| 2 | 994 | 69.9 | 107 | 10:1 |
| 3 | 1,022 | 69.8 | 112 | 10:1 |
| 4 | 1,045 | 62.5 | 152 | 10:1 |
| Catalyst C, 0.375 wt. percent Pt, 0.22 wt. percent Sn | | | | |
| 1 | 970 | 76.4 | 63 | 10:1 |
| 2 | 978 | 77.5 | 56 | 10:1 |
| 4 | 992 | 76.3 | 61 | 10:1 |
| 6 | 999 | 76.3 | 62 | 10:1 |

While it appears at first glance that catalyst C is substantially equivalent to catalyst A with respect to stability it should be noted that the test provisions were substantially less severe with respect to catalysts B and C in that the hydrogen/hydrocarbon mole ratio employed was 10:1 as opposed to 5:1 with respect to catalyst A. Also, $C_5+$ yield is similar but temperature is much lower for catalyst A.

I claim as my invention:

1. A method of catalyst manufacture which comprises impregnating a high surface area porous carrier material with a buffer solution containing sufficient platinum group metal to form a catalyst product having a platinum group metal content of from about 0.01 to about 2% by weight, sufficient rhenium or Group IV–A metal to impart to said catalyst product a rhenium or Group IV–A metal content of from about 0.01 to about 5% by weight, and a sufficient amount of a halogen-free weak acid to maintain the pH of said solution at less than about 3.5 in contact with said carrier material; and drying and calcining the thus impregnated carrier material.

2. The method of claim 1 further characterized in that said solution contains chloroplatinic acid and stannous chloride.

3. The method of claim 2 further characterized in that said weak acid is oxalic acid.

4. The method of claim 1 further characterized in that said solution contains chloroplatinic acid.

5. The method of claim 1 further characterized in that said solution contains a tin halide.

6. The method of claim 1 further characterized in that said solution contains stannous chloride.

7. The method of claim 1 further characterized in that said weak acid is oxalic acid.

8. The method of claim 1 further characterized in that said carrier material is a refractory inorganic oxide.

9. The method of claim 1 further characterized in that carrier material is an alumina.

10. The method of claim 1 further characterized in that said amount of weak acid is sufficient to maintain said pH at least than about 1.

References Cited
UNITED STATES PATENTS

| | | | |
|---|---|---|---|
| 3,449,237 | 6/1969 | Jacobson et al. | 208—139 |
| 3,511,888 | 5/1970 | Jenkins | 252—460 |
| 3,578,584 | 5/1971 | Hayes | 252—441 |
| 3,632,503 | 1/1971 | Hayes | 252—466 PT |
| 3,632,525 | 1/1971 | Rausch | 252—442 |
| 2,890,167 | 6/1959 | Haensel | 208—139 |
| 2,948,672 | 8/1960 | Brennan | 208—139 |

PATRICK P. GARVIN, Primary Examiner

U.S. Cl. X.R.

252—442, 466 PT; 208—138, 139